United States Patent [19]

Toushek et al.

[11] Patent Number: 4,579,660

[45] Date of Patent: Apr. 1, 1986

[54] METHOD FOR TREATMENT OF BIOMASS

[75] Inventors: Dimko K. Toushek; Peter T. Nedkov; Antoaneta A. Lilova; Nikolay L. Marekov; Ivan L. Stoilov; Krassimira N. Idakieva, all of Sofia, Bulgaria

[73] Assignee: Edinen Centar po Chimia, Sofia, Bulgaria

[21] Appl. No.: 620,432

[22] Filed: Jun. 14, 1984

[30] Foreign Application Priority Data

Jun. 14, 1983 [BG] Bulgaria ................... 61328

[51] Int. Cl.4 ............................. C02F 1/44; A23J 3/00
[52] U.S. Cl. .................................. 210/632; 210/638; 426/32; 426/657; 435/272
[58] Field of Search ............... 210/632, 638, 639, 650, 210/651; 435/268, 269, 271, 272; 426/56, 643, 647, 32, 42

[56] References Cited

U.S. PATENT DOCUMENTS 4,262,022 4/1981 Hald-Christensen et al. ... 426/647 X
4,267,049 5/1981 Erickson et al. ............... 210/632 X
4,342,650 8/1982 Erickson et al. ............... 210/632 X Primary Examiner—Thomas Wyse

[57] ABSTRACT

The invention relates to a method for treatment of the biomass. The crude biomass is hydrolyzed by means of a proteolytic enzyme, the dissolved hard particles are separated from the total hydrolyzate by rough filtration, and the filtrated enzymatic hydrolyzate is submitted to membrane separation through semipermeable membranes.

All of the steps are carried out at mild operating conditions, which preserves the structure and composition of the nonproteinic compounds. The use of organic solvents is entirely avoided, resulting in a safer process. The available proteins are extracted from the total mass as a protein hydrolyzate, which is easily digested. The final product yield is 92–95% amino acids. Gel chromatographic analysis of the final product shows that the free amino acids and the peptides have a molecular weight of 1000 to 4000 Daltons.

2 Claims, No Drawings

METHOD FOR TREATMENT OF BIOMASS

This invention relates to a method for treatment of the biomass from different terrestrial and marine organisms, so that it can be completely utilized as a source of protein hydrolyzate, lipids and physiologicaly active substance.

BACKGROUND OF THE INVENTION

Thermal and extraction methods for the treament of the biomass and its separation from the available fatty substances are known. See, Libermann S., V. Petrovskiy, "Spavotshnoe rukovodstvo po proisvodvu technitsheskih fabrikatov na miassokombinatah", Pishtepromizdat, Moskova, str. 92–260 (1961). The thermal methods, which can be devided into "humid" and "dry" methods according to the way of heating the initial biomass are based on the relatively low melting point of the fatty substances, which are separated in molten state from the rest, consisting of the so-called "animal food meal". See, Libermann and Petrovskiy.

The disadvantages of the thermal methods are as follows. There is a low degree of extraction of the fatty substances; from 12 to 18% of unextracted fatty substances remain in the meal, which imposes an additional treatment step. High temperatures are needed to carry out the process, creating conditions for hydrolysis and thermal destruction of the lipids and the other ingredients. There is also a high consumption of energy.

Methods for treatment of the biomass are also known using fish and mussels of low quality, which are directly treated to obtain fish and mussel meals. See, Sakandelidze O., G. Kipiani (redaktori), "Biologitsheski aktivnie veshtestva gidrobintovnoviy istotshnik lekarstv", Shtiintza, kishinev, str. 116–124 (1979); Abadjieva V., sp. "priroda i znanie", kn. 1, str, 12 (1970). Despite their high nutritive qualities, these meals possess an unpleasant specific odor and taste which limits their use as animal food. A special dosage is required because of the worsening of the gustatory qualities of the meat for feeding animals such kinds of meal.

In comparison with the thermal methods, the extraction methods show a more complete separation. See, Libermann and Petrovskiy. The lipids extracted from non-industrial and inferior value marine organisms are treated, and substitutes of fish oils, meals and physiologically active substances are obtained. See, Sakandelidze and Kipiani. These methods are also used to investigate the sterol composition of marine organisms as well as in the extraction of physiologically active substances from them. See, Avt. svidetestvo na NRB, reg. N. 41541/1978.

The disadvantages of the extraction methods are as follows. They use a large amount of organic solvents for the extraction without achieving a complete separation of the lipids (2% remain unextracted). Conditions are created for the formation of stable emulsions and suspensions, which complicate additionally the separation of the lipids form the biomass. The used organic solvents are highly inflammable and harmful to health.

Methods are known using acid (5,6) and enzymatic (5,6) hydrolisis of the protein biomass with the purpose to obtain a semi-synthetical feed for cell culture as well as for obtaining protein hydrolyzate for animal foodstuffs. See, Libermann and Petrovkiy; Avt. svidetestvo na NRB, reg. N. 41541/1978; and Avt. svidetestvo na NRB, reg. N. 46878/1980.

A basic disadvantage of these methods is the fact that the protein hydrolyzates are obtained in the form of total mixtures, containing lipids, nucleic acids and the like. Besides, during the acid hydrolysis the process is further complicated because of the destruction of some of the aminoacids, which involves a lowering of the nutritive value of the obtained hydrolyzates. Chemical modifications also occur with some of the lipid components.

The application of semipermeable membranes for the separation of different kinds of substances from their solution owning to their different molecular weight is also known. See, Hvang S., K. Kamermayer, "Membranie prozesi razdelenia", "Himia", Moskva (1981).

SUMMARY OF THE INVENTION

The task of this invention is to provide a method for the treatment of the biomass, to obtain and separate, in high yield and native form, all the aminoacids as highly purified proteic hydrolyzates and total lipids.

This task is resolved with a method wherein the crude biomass is submitted to a hydrolysis in the presence of a proteolytic enzyme of a concentration from 10 up to 15 PE per ml, at a temperature of from 20° up to 70° C. for a time of from 30 up to 90 minutes. From the total mass by means of a rough filtration are separated the undissolved solids—shells, bones, scales and so on. From the filtrate by means of a membrane filtration method the lypophilic and the hydrophylic parts are separated. After the membrane separation the obtained crude lipids represent a valuable raw material for the food and the pharmaceutical industries. The hydrophylic part represents a solution enriched with oligopeptids and free aminoacids.

The membrane separation of the lypophylic and the hydrophylic components is due to the difference in their behaviour towards the semipermeable membrane in such a manner that even the strongly polarized phospholipids do not pass through the membrane. All the nonproteinic components keep their native state while the proteinic components are obtained in the form of products containing all the aminoacids in the native state.

The advantages of the proposed method for the treatement of the biomass over the already known methods are as follows. All the operations are carried out exclusively under mild conditions, which permits the preservation to a highest degree of the chemical structure and the composition of all the nonproteinic substances. The use of organic solvents for the extraction of the lipids is entirely avoided and at the same time the working conditions are improved in safety. The available proteins are extracted from the total mass in the form of protein hydrolyzate, which represents an easy digestible food of high value, useful as an additive in the food industry and as a directly absorbable dietary supplement for peaple with sickness of the digestive system.

The method according to the invention is illustrated by the following examples.

EXAMPLE 1

Treatment of the biomass from the fish Trizona.

To 10 kg of the fish Trizona are added 2 l water, 2.5 ml subtilizine DI (acaline proteasa) with an activity of 50,000 PE/ml. The mixture is stirred by means of a mechanical stirrer at a temperature of 50° C. for a time of 45 minutes. The obtained enzymatic hydrolyzate is filtrated to remove the fishbones. The filtrate is submitted to ultrafiltration through a hydrophilic semipermeable membrane permitting the passage of the hydrolysed proteins and the others low-molecular water-soluble substances. After the lyophilisation of the ultrafiltrate is obtained a dry pale-yellow hydrolyzate of 700 g. Under these conditions the lipids do not pass through the membrane and are separated as a crude lipid concentrate of 140 g.

EXAMPLE 2

Treatment of the biomass from black mussels.

30 kg of black mussels put in an appropriate vessel are soaked with 15 l water and 12 ml stabilized in a solution of alcaline proteaza (subtilizine DI) with an activity of 50,000 PE/ml. A continuous circulation is kept up in the vessel for a time of 1 hour at a temperature of 45° C. The obtained enzymatic hydrolyzate is separated from the shells by draining it from the bottom of the vessel. Then the hydrolyzate is ultrafiltrated through a hydrophilic semipermeable membrane permitting the passage of the hydrolysed proteins and the other low-molecular watersoluble substances. After concentration and lyophilisation of the ultrafiltrate is obtained a slightly coloured dry protein hydrolyzate of 2350 g. Under these conditions the lipids do not pass through the membrane and are separated as a crude lipid concentrate weighting 397 g, intensively coloured because of the presence of a high concentration of carotins.

EXAMPLE 3

Treatment of other kinds of biomass.

By analogy as in examples 1 and 2, are obtained protein hydrolyzates and total lipids from freshwater and marine microalgae; from waste products of the fish industry; from by-products of the dairy industry such as skimed milk, butter-milk, whey and the like.

As a result of the use of a lypophilic semipermeable membrane the lipids are passed through the membrane and are collected as an ultrafiltrate.

EXAMPLE 4

Obtaining of protein hydrolyzate from meat wastes and meat bran.

To 5 kg meat wastes or meat bran (boiled and pressed meat) are added 10 l water and 40 ml alcaline proteasa with an activity of 25,000 PE/g (i.e. 700 PE/1 g dry product of the initial substance). The temperature of the mixture is increased to from 40° up to 70° C., preferably to 58° C. stirring continuously. The pH of the solution is corrected at pH 7.5–9.5 by means of a solution of NaOH. About 2 hours after is added a new portion of 15 ml alcaline proteasa with an activity of 25,000 PE/g and the hydrolysis is carried out for another 1.5 hours. The obtained homogenous suspension is centrifuged at from 3000 up to 10,000 g in a periodically acting centrifuge of a separator and the obtained yellowish liquid is ultrafiltrated through a hydrophilic membrane permitting the passage of the molecules of a molecular weight from 10,000 to 200,000. A limpid pale-yellow liquid is obtained. For the time being from the experimented devices the most appropriate appeared to be the system of spiral type. The ultrafiltrate is concentrated by means of the ultrafiltration, the return-osmosis or the vaccuum-rotatioal device. After wrapping and sterilization the product is dried in an atomizer or a lyophilizator.

Yield 30–55% from the dry initial substance. The analysis of the aminoacids after acid hydrolysis for a time of 20 hours at 105° C. in a 6 M solution of HCL, shows the following percentage of the free aminoacids, in micromoles:

Lys—7.8%, His—2.4%, Arg—4.7%, Asp—9.8%, Thr—5.6%, Ser—5.7%, Glu—15.2%, Pro—4.8%, Gly—8.6%, Ala—9.7%, Cys—traces, Val—4.5%, Met—2.6%, Ile—3.5%, Leu—9.8%, Tyr—2.4%, Phe—2.9%.

The mean deviation of the percentage for every one of the aminoacids is ±2%.

EXAMPLE 5

Obtaining of a hydrolyzate from slaughterhouse blood.

To 5 l slaughterhouse blood are added 5 l drinking water and 27 ml alcaline proteasa with an acitivty of 25,000 PE/g (To 1 g dry substance of blood are added 700 PE alcaline proteasa). If at the moment of the enzymatic treatment the blood is already curdled it must be broken with a high-speed mechanical stirrer. The temperature of the mixture is maintained between 40° and 70° C., preferably 58° C. After stirring for a time of 3 hours often are seen small fibrin aggregates. To the mixture are added a second 11 ml solution of the alcaline proteasa with an activity of 25,000 PE/g. After an additional 3 hours stirring at a temperature of 58° C. a dark-brown turbid liquid is obtained. During the hydrolysis it is preferable to keep the pH of the mixture at 7.5–9.5. The liquid is centrifuged at 3000–10,000 g or with a separator, and a dark-red precipitate is obtained of a volume equal to about 1/6 of the volume of the initial suspension. The relatively turbid supernatant is submitted to an ultrafiltration through a hydrophilic membrane permitting the passage of the molecules of a molecular weight of from 10,000 up to 200,000. A pale-yellow limpid liquid is obtained. For the time being from the experimented devices the most appropriate appeared to be the system of spiral type. The ultrafiltrate is concentrated by means of the ultrafiltration, the return-osmosis and the vaccuum-rotational device. After wrapping and sterilization the product is dried in an atomizer or a lyophilizator.

Yield: 25–40% from the dry initial substance in the blood. The analysis of the aminoacids after acid hydrolysis for a time of 20 hours at 105° C. in a 6 M solution of HCL shows the following molar percentage of free aminoacids: Lys—7.8%, His—5.1%, Arg—2.5%, Asp—8.9%, Thr 5.9%, Ser—7.3%, Glu—8.2%, Pro—2.6%, Gly—7.9%, Ala—15.4%, Val—7.7%, Met—1.8%, Ile—0.6%, Leu—10.6%, Tyr—2.4%, Phe 5.1%.

The mean deviation of the percentage for every one of the aminoacids is ±1.5%. From the found amounts of the aminoacids was evaluated the total amount of 74.16% aminoacids for the final product. Taking into account the full loss of cysteine and tryptophan, the partial loss of serine, methionine and tyrosine, as well as the incomplete hydrolysis of the peptides containing leucine-valine-isoleucine under the specified conditions, the product is evaluated to contain 92–95% aminoacids.

The gelchromatographic analysis of the final product on Sephadex G-25 shows that it consists of free aminoacids and peptides of a molecular weight of 1000 up to 4000 Daltons.

We claim:

1. A method for the treatment of a crude native homogeneous biomass obtained from macro-and/or micro-organisms and containing at least proteins and lipids, comprising adding a single thermostable proteolytic alkaline protease to the native biomass conducting a proteolytic enzyme hydrolysis of the crude biomass for 30 to 90 mintues at a temperature of from 20°-70° C. to obtain a crude hydrolysate, conducting a rough filtration of the crude hydrolysate to remove the undissolved components therefrom and to obtain an enzymatic hydrolysate, and conducting a ultrafiltration of the enzymatic hydrolysate through hydrophylic and hydropobic semipermeable membranes to obtain a pure amino acid, a low molecular weight peptide fraction, and a native lipid fraction.

2. A method according to claim 1, wherein the proteolytic alkaline protease is subtilisin DI in a concentration of from 15-30 PE per milliliter of biomass.

* * * * *